United States Patent
Yamamoto et al.

(10) Patent No.: US 10,581,349 B2
(45) Date of Patent: Mar. 3, 2020

(54) MAGNETIC POLE POSITION DETECTING DEVICE FOR SYNCHRONOUS MOTOR AND MAGNETIC POLE POSITION DETECTING METHOD FOR SYNCHRONOUS MOTOR

(71) Applicant: FANUC CORPORATION, Yamanashi (JP)

(72) Inventors: Kenta Yamamoto, Yamanashi-ken (JP); Naoto Sonoda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/053,007

(22) Filed: Aug. 2, 2018

(65) Prior Publication Data
US 2019/0044462 A1    Feb. 7, 2019

(30) Foreign Application Priority Data

Aug. 7, 2017 (JP) ................................ 2017-152509

(51) Int. Cl.
*H02K 29/06* (2006.01)
*H02P 6/00* (2016.01)
(Continued)

(52) U.S. Cl.
CPC ............ *H02P 6/181* (2013.01); *G07C 5/0825* (2013.01); *H02P 6/12* (2013.01); *H02P 6/16* (2013.01);
(Continued)

(58) Field of Classification Search
CPC ................................ H02P 6/181; H02P 25/024
(Continued)

(56) References Cited

U.S. PATENT DOCUMENTS 8,766,586 B2 * 7/2014 Sonoda ................ H02P 6/18
318/400.12
2012/0133311 A1 * 5/2012 Kawai .................. H02P 6/181
318/400.12
(Continued)

FOREIGN PATENT DOCUMENTS

JP        2008283831 A    11/2008
JP        2009254045 A    10/2009
(Continued)

OTHER PUBLICATIONS

English Abstract and Machine Translation for Japanese Publication No. 2010-041868 A, published Feb. 18, 2010, 22 pgs.
(Continued)

*Primary Examiner* — Erick D Glass
(74) *Attorney, Agent, or Firm* — Fredrikson & Byron, P.A.

(57) ABSTRACT

A magnetic pole position detecting device for a synchronous motor includes: a storage unit for storing a reference magnetic pole position of the synchronous motor as a predetermined reference; a magnetic pole position detector for detecting the magnetic pole position of the synchronous motor when a predetermined condition is satisfied; and a determination unit for comparing the reference magnetic pole position stored in the storage unit with the magnetic pole position detected by the magnetic pole position detector to determine that detection of the magnetic pole position is abnormal when the difference between the two falls out of a predetermined range.

13 Claims, 2 Drawing Sheets

(51) Int. Cl.
*H02P 6/18* (2016.01)
*H02P 6/12* (2006.01)
*H02P 25/022* (2016.01)
*G07C 5/08* (2006.01)
*H02P 6/16* (2016.01)
*H02P 25/024* (2016.01)

(52) U.S. Cl.
CPC .......... *H02P 25/022* (2013.01); *H02P 25/024* (2016.02); *H02P 2203/03* (2013.01)

(58) Field of Classification Search
USPC .................................................. 318/400.32
See application file for complete search history.

(56) References Cited

U.S. PATENT DOCUMENTS

| | | | | |
|---|---|---|---|---|
| 2014/0111130 A1* | 4/2014 | Yamada | ................ | B60L 3/0038 |
| | | | | 318/400.32 |
| 2015/0234011 A1* | 8/2015 | Cloutier | ............... | G01R 31/343 |
| | | | | 318/490 |
| 2017/0222582 A1 | 8/2017 | Suzuki | | |

FOREIGN PATENT DOCUMENTS

| | | |
|---|---|---|
| JP | 201041868 A | 2/2010 |
| JP | 2011239563 A | 11/2011 |
| JP | 2013183469 A | 9/2013 |
| JP | 2017135950 A | 8/2017 |
| WO | 2014192467 A1 | 12/2014 |

OTHER PUBLICATIONS

English Abstract and Machine Translation for Japanese Publication No. 2009-254045 A, published Oct. 29, 2009, 10 pgs.
English Abstract and Machine Translation for Japanese Publication No. 2008-283831 A, published Nov. 20, 2008, 8 pgs.
English Abstract and Machine Translation for Japanese Publication No. 2013-183469 A, published Sep. 12, 2013, 13 pgs.
English Abstract and Machine Translation for Japanese Publication No. 2017-135950 A, published Aug. 3, 2017, 17 pgs.
English Abstract and Machine Translation for Japanese Publication No. 2011-239563 A, published Nov. 24, 2011, 7 pgs.
English Abstract and Machine Translation for International Publication No. 2014192467 A1, published Dec. 4, 2014, 14 pgs.

* cited by examiner

MAGNETIC POLE POSITION DETECTING DEVICE FOR SYNCHRONOUS MOTOR AND MAGNETIC POLE POSITION DETECTING METHOD FOR SYNCHRONOUS MOTOR

CROSS-REFERENCE TO RELATED APPLICATION

This application is based upon and claims the benefit of priority from Japanese Patent Application No. 2017-152509 filed on Aug. 7, 2017, the contents of which are incorporated herein by reference.

BACKGROUND OF THE INVENTION

Field of the Invention

The present invention relates to a magnetic pole position detecting device for a synchronous motor and a magnetic pole position detecting method for a synchronous motor to determine abnormality in magnetic pole position detection in a synchronous motor.

Description of the Related Art

In order for a synchronous motor to generate a desired torque, current having a phase corresponding to a magnetic pole position needs to be supplied to the synchronous motor. Therefore, to control the synchronous motor, it is necessary to accurately detect the magnetic pole position. The magnetic pole position is detected using a detection signal of a position detector such as an encoder attached to the synchronous motor.

Japanese Laid-Open Patent Publication No. 2009-254045 discloses a magnetic pole position detecting device for a synchronous motor. Briefly describing, the magnetic pole position detecting device calculates a correction amount by implementing PI calculation so that the rotor initial position and the rotor current position coincide with each other, adds this correction amount and the initial value of the magnetic pole position to calculate a magnetic pole position setting value. Then, the magnetic pole position detecting device uses the positional information corresponding to the set magnetic pole position setting value to determine a current vector to be supplied to the synchronous motor. As a result, it is possible to detect the magnetic pole position without performing complicated calculation.

SUMMARY OF THE INVENTION

However, when the mounting position of the rotational position detector shifts due to deterioration over time, or when the mounting position deviates at the time of attaching the rotational position detector, there is a risk that the synchronous motor becomes unable to generate a desired torque and goes out of control.

It is therefore an object of the present invention to provide a magnetic pole position detecting device for a synchronous motor and a magnetic pole position detecting method for a synchronous motor to determine abnormality in magnetic pole position detection of a synchronous motor due to positional displacement of the mounting position of a position detector.

According to a first aspect of the present invention, a magnetic pole position detecting device for a synchronous motor includes: a storage unit configured to store a reference magnetic pole position of the synchronous motor as a predetermined reference; a magnetic pole position detector configured to detect the magnetic pole position of the synchronous motor when a predetermined condition is satisfied; and a determination unit configured to compare the reference magnetic pole position stored in the storage unit with the magnetic pole position detected by the magnetic pole position detector and determine that detection of the magnetic pole position is abnormal when the difference between the two falls out of a predetermined range.

According to a second aspect of the present invention, a magnetic pole position detecting method for a synchronous motor includes: a storing step of storing a reference magnetic pole position of the synchronous motor in a storage unit as a predetermined reference; a magnetic pole position detecting step of detecting the magnetic pole position of the synchronous motor when a predetermined condition is satisfied; and a determination step of comparing the reference magnetic pole position stored in the storage unit with the detected magnetic pole position and determining that detection of the magnetic pole position is abnormal when the difference between the two falls out of a predetermined range.

According to the present invention, it is possible to easily and accurately determine abnormality in magnetic pole position detection due to positional displacement of the mounting position of the position detector.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The magnetic pole position detecting device for a synchronous motor and the magnetic pole position detecting method for a synchronous motor according to the present invention will be detailed hereinbelow by describing preferred embodiments with reference to the accompanying drawings.

[First Embodiment]

Figure 1:
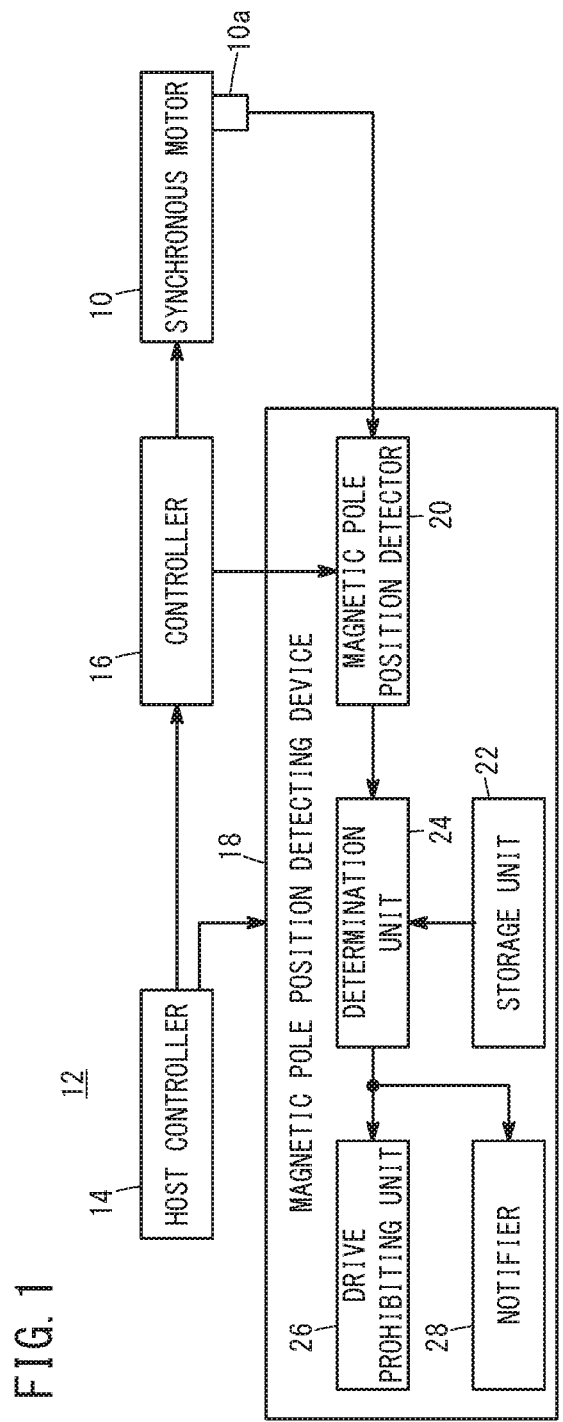
FIG. 1 is an electrical configuration diagram of a control system according to an embodiment.

FIG. 1 is an electrical configuration diagram of a control system 12 having a synchronous motor 10. The control system 12 includes a synchronous motor 10, a host controller 14, a controller (motor controller) 16 and a magnetic pole position detecting device 18.

The synchronous motor 10 is a servomotor attached to a machine tool, a robot or the like. The synchronous motor 10 is provided with a position detector (e.g., encoder) 10a that detects the rotational position of the synchronous motor 10 (more specifically, the rotational position of the rotor of the synchronous motor 10). The rotational speed of the synchronous motor 10 (more specifically, the rotational speed of the rotor of the synchronous motor 10) is also known by detection of the rotational position from the position detector 10a.

The host controller 14 controls the controller 16 and outputs a speed command or a position command to the controller 16 according to a program (for example, a machining program or the like) or an operator's instruction. The controller 16 controls the synchronous motor 10 in accordance with the speed command or the position command sent from the host controller 14. The controller 16 performs feedback control of the synchronous motor 10 using the rotational position or rotational speed of the synchronous motor 10 detected by the position detector 10a.

The magnetic pole position detecting device 18 detects the magnetic pole position of the synchronous motor 10. The magnetic pole position detecting device 18 determines whether or not detection of the magnetic pole position is abnormal. Detection abnormality of the magnetic pole position occurs due to positional displacement of the mounting position of the position detector 10a. The magnetic pole position detecting device 18 includes a magnetic pole position detector 20, a storage unit 22, a determination unit 24, a drive prohibition unit 26 and a notifier 28.

When a predetermined condition is satisfied, the magnetic pole position detector 20 detects the magnetic pole position, based on the rotational position of the synchronous motor 10. The magnetic pole position detector 20 may directly acquire the rotational position of the synchronous motor 10 from the position detector 10a or by way of the controller 16.

Here, when a predetermined condition holds, the controller 16 supplies a current of a predetermined excitation phase to the synchronous motor 10 (more specifically, a coil wound on the stator of the synchronous motor 10). As a result, the rotor of the synchronous motor 10 is fixed at a rotational position determined by a predetermined excitation phase and the number of magnetic poles. The magnetic pole position detector 20 detects the magnetic pole position, based on the rotational position (phase) of the synchronous motor (i.e., the rotor) when current of the predetermined excitation phase is supplied to the synchronous motor 10. Since this magnetic pole position detecting method is well known, detailed description is omitted.

Examples of the case where a predetermined condition holds include a case where the control system 12 is energized, a case where an operator instructs start of abnormality determination as to magnetic pole position detection and other cases. As the control system 12 is energized, power is supplied to the host controller 14, the controller 16 and the magnetic pole position detecting device 18.

Upon turning on the power supply to the control system 12, the host controller 14 may output a signal notifying satisfaction of a predetermined condition, to the controller 16 and the magnetic pole position detecting device 18. Further, the host controller 14 may have an input unit for accepting operator's input so as to transmit a signal indicating satisfaction of a predetermined condition to the controller 16 and the magnetic pole position detecting device 18 when an operator instructs start of abnormality determination as to magnetic pole position detection.

Stored beforehand in the storage unit 22 is a reference magnetic pole position of the synchronous motor 10 serving as a reference. This reference magnetic pole position is the magnetic pole position detected by the magnetic pole position detector 20 when there is no error (no positional deviation) in the mounting position of the position detector 10a.

The determination unit 24 compares the magnetic pole position detected by the magnetic pole position detector 20 with the reference magnetic pole position stored in the storage unit 22. When the difference between the two falls out of a predetermined range, the determination unit 24 determines that the magnetic pole position detection is abnormal, that is, the mounting position of the position detector 10a is deviated. Thus, it is possible to easily and accurately determine abnormality in magnetic pole position detection due to positional deviation of the mounting position of the position detector 10a. When determining that the detection of the magnetic pole position is abnormal, the determination unit 24 outputs an abnormality signal to the drive prohibiting unit 26 and the notifier 28.

Upon reception of the abnormality signal from the determination unit 24, the drive prohibiting unit 26 prohibits the synchronous motor 10 from operating as an alarm process. Thereby, it is possible to prevent the synchronous motor 10 from being driven in a state where the synchronous motor 10 cannot be properly controlled. The drive prohibiting unit 26 outputs a drive prohibiting signal to the host controller 14 or the controller 16 so as to prohibit the driving of the synchronous motor 10. Upon reception of the drive prohibiting signal, the host controller 14 or the controller 16 prohibits the driving of the synchronous motor 10.

Upon receiving the abnormality signal from the determination unit 24, the notifier 28 gives an alarm to the operator as an alarm process. Thus, the operator can recognize the abnormality in magnetic pole position detection. The notifier 28 may include an unillustrated display unit so as to display alarm information thereon and thereby inform the operator of the alarm. In addition, the notifier 28 may include an unillustrated speaker or light emitter so as to notify the alarm by sound or light.

Upon reception of the abnormality signal from the determination unit 24, the notifier 28 outputs an abnormality signal to the host control unit 14, or an external device, including a notification device (display unit, speaker, light-emitter or the like) to warn the operator. Upon reception of the abnormality signal, the host controller 14 or the external device gives the alarm to the operator using the notification device thereof.

Figure 2:
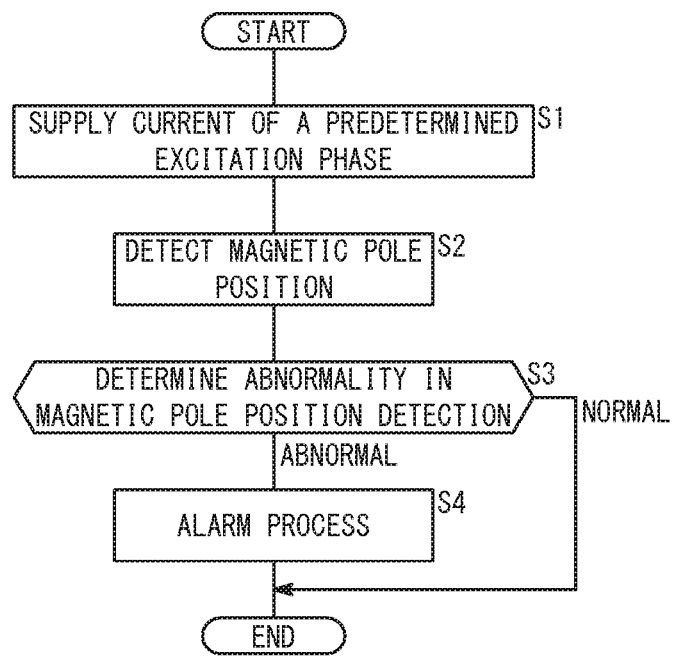
FIG. 2 is a flowchart showing the operation of the control system.

Next, the operation of the control system 12 will be described with reference to the flowchart of FIG. 2. The operation shown in FIG. 2 is performed when a predetermined condition is satisfied.

When a predetermined condition is satisfied, the controller 16 supplies current of the predetermined excitation phase to the synchronous motor 10 at step S1.

Next, at step S2 the magnetic pole position detector 20 detects the magnetic pole position based on the rotational position detected from the position detector 10a. The magnetic pole position detector 20 detects the magnetic pole position based on the rotational position (phase) of the rotor when current of the predetermined excitation phase is supplied to the synchronous motor 10.

Next, at step S3 the determination unit 24 reads the reference magnetic pole position from the storage unit 22, and based on the read reference magnetic pole position and the magnetic pole position detected by the magnetic pole position detector 20, determines whether or not detection of the magnetic pole position is abnormal. The determination unit 24 compares the detected magnetic pole position with the reference magnetic pole position. When the difference therebetween falls out of the predetermined range, the determination unit 24 determines that the detection of the magnetic pole position is abnormal, that is, the mounting position of the position detector 10a is deviated. When determining that the magnetic pole position detection is abnormal, the determination unit 24 outputs an abnormality signal to the drive prohibiting unit 26 and the notifier 28.

If it is determined at step S3 that the magnetic pole position detection is abnormal, the control goes to step S4, and the drive prohibiting unit 26 and the notifier 28 perform the alarm process and terminate the current operation. More specifically, the drive prohibiting unit 26 stops the operation of the synchronous motor 10 as an alarm process. The notifier 28 notifies the operator of the abnormal detection of the magnetic pole position as the alarm process. Although both the prohibition of the driving of the synchronous motor 10 and the notification of the alarm are performed as the alarm process, only one of them may be performed.

At step S3, when it is determined that the magnetic pole position detection is not abnormal, that is, it is normal, this operation is ended.

By designating the activation of the power supply as the predetermined condition, it is possible to determine whether there is an abnormality in magnetic pole position detection before driving the synchronous motor 10. Further, by designating an operator's instruction to start abnormality determination as the predetermined condition, the operator can determine whether the magnetic pole position detection is abnormal when the operator wants to know if the magnetic pole position is normally detected or not.

MODIFIED EXAMPLES

The above embodiment may be modified as follows.

Modified Example 1

In the above embodiment, the host controller 14 and the controller 16 are explained separately, but a single controller may be functioned as the host controller 14 and the controller 16.

Modified Example 2

In the above embodiment, the controller 16 is configured to supply a current of the predetermined excitation phase to the synchronous motor 10 when a predetermined condition is satisfied. However, a current of the predetermined excitation phase may be supplied to the synchronous motor 10 after a command signal is transmitted from the magnetic pole position detector 20. In this case, when a predetermined condition is satisfied, the magnetic pole position detector 20 outputs the command signal for starting detection of the magnetic pole position to the controller 16.

As another method, the magnetic pole position detector 20 may start detecting the magnetic pole position when a command signal for starting detection of the magnetic pole position is sent from the controller 16. In this case, when a predetermined condition is satisfied, the controller 16 supplies a current of the predetermined excitation phase to the synchronous motor 10 and outputs the command signal to the magnetic pole position detector 20.

Modified Example 3

At least part of the magnetic pole position detecting device 18 (at least one of the magnetic pole position detector 20, the storage unit 22, the determination unit 24, the drive prohibiting unit 26 and the notifier 28) may be provided in the host controller 14 or the controller 16. For example, the storage unit 22 and the notifier 28 may be provided in the host control unit 14. Further, the magnetic pole position detector 20, the determination unit 24 and the drive prohibiting unit 26 may be provided in the controller 16. This cuts down the cost of the magnetic pole position detecting device 18.

Modified Example 4

The above Modified Examples 1 to 3 may be arbitrarily combined as long as no inconsistency occurs.

[Technical Idea Obtained from the Embodiment]

Technical ideas that can be grasped from the above embodiment and Modified Examples 1 to 4 are described below.

<First Technical Idea>

A magnetic pole position detecting device (18) for a synchronous motor (10), includes: a storage unit (22) configured to store a reference magnetic pole position of the synchronous motor (10) as a predetermined reference; a magnetic pole position detector (20) configured to detect the magnetic pole position of the synchronous motor (10) when a predetermined condition is satisfied; and a determination unit (24) configured to compare the reference magnetic pole position stored in the storage unit (22) with the magnetic pole position detected by the magnetic pole position detector (20) and determine that detection of the magnetic pole position is abnormal when the difference between the two falls out of a predetermined range.

As a result, it is possible to easily and accurately determine abnormality in magnetic pole position detection due to positional deviation of the mounting position of the position detector (10*a*).

The magnetic pole position detector (20) may be configured to determine that the predetermined condition is satisfied when a controller (16, 14) for controlling the drive of the synchronous motor (10) is energized. This configuration makes it possible to determine whether there is an abnormality in magnetic pole position detection before driving the synchronous motor (10).

The magnetic pole position detector (20) may be configured to determine that the predetermined condition is satisfied when an operator's instruction to start abnormality determination is given. This configuration enables the operator to determine whether the magnetic pole position detection is abnormal when the operator wants to know if the magnetic pole position is normally detected or not.

The magnetic pole position detecting device (18) may further include a drive prohibiting unit (26) configured to prohibit the synchronous motor (10) from driving when the determination unit (24) determines that there is an abnormality. Thereby, it is possible to prevent the synchronous motor (10) from being driven in a state where the synchronous motor (10) cannot be properly controlled.

The magnetic pole position detecting device (18) may further include a notifier (28) configured to notify the operator of the occurrence of an abnormality when the determination unit (24) determines that there is an abnormality. Thereby, the operator can recognize that there is an abnormality in detection of the magnetic pole position.

At least part of the magnetic pole position detecting device (18) is provided in a controller (16) for controlling the driving of the synchronous motor (10) or in a host controller (14) for controlling the controller (16). This cuts down the cost of the magnetic pole position detecting device (18).

When the predetermined condition is satisfied, a current of a predetermined excitation phase is supplied to the synchronous motor (10) from a controller (16, 14) for controlling the drive of the synchronous motor (10), and the magnetic pole position detector (20) is configured to detect the magnetic pole position, based on the rotational position of the rotor of the synchronous motor (10) when the current of the predetermined excitation phase is supplied. Thereby, the magnetic pole position can be easily detected.

<Second Technical Idea>

A magnetic pole position detecting method for a synchronous motor (10) includes: a storing step of storing a reference magnetic pole position of the synchronous motor (10) in a storage unit (22) as a predetermined reference; a magnetic pole position detecting step of detecting the magnetic pole position of the synchronous motor (10) when a predetermined condition is satisfied; and a determination step of comparing the reference magnetic pole position stored in the storage unit (22) with the detected magnetic pole position and determining that detection of the magnetic pole position is abnormal when the difference between the two falls out of a predetermined range.

As a result, it is possible to easily and accurately determine abnormality in magnetic pole position detection due to positional deviation of the mounting position of the position detector (10a).

The magnetic pole position detecting step may regard that the predetermined condition is satisfied when a controller (16, 14) for controlling the drive of the synchronous motor (10) is energized. This configuration makes it possible to determine whether there is an abnormality in magnetic pole position detection before driving the synchronous motor (10).

The magnetic pole position detecting step may regard that the predetermined condition is satisfied when an operator's instruction to start abnormality determination is given. This configuration enables the operator to determine whether the magnetic pole position detection is abnormal when the operator wants to know if the magnetic pole position is normally detected or not.

The magnetic pole position detecting method may further include a drive prohibiting step of prohibiting the synchronous motor (10) from driving when the determination unit determines that there is an abnormality. Thereby, it is possible to prevent the synchronous motor (10) from being driven in a state where the synchronous motor (10) cannot be properly controlled.

The magnetic pole position detecting method may further include a notifying step of notifying the operator of the occurrence of an abnormality when the determination unit determines that there is an abnormality. Thereby, the operator can recognize that there is an abnormality in detection of the magnetic pole position.

When the predetermined condition is satisfied, a current of a predetermined excitation phase is supplied to the synchronous motor (10) from a controller (16, 14) for controlling the drive of the synchronous motor (10), and the magnetic pole position detecting step may detect the magnetic pole position, based on the rotational position of the rotor of the synchronous motor (10) when the current of the predetermined excitation phase is supplied. Thereby, the magnetic pole position can be easily detected.

Although certain preferred embodiments of the present invention have been shown and described in detail, it should be understood that various changes and modifications may be made therein without departing from the scope of the appended claims.

What is claimed is:

1. A magnetic pole position detecting device for a synchronous motor, comprising:
    a position detector provided for the synchronous motor and configured to detect a rotational position of the synchronous motor,
    a magnetic pole position detector configured to detect a magnetic pole position of the synchronous motor based on the rotational position detected by the position detector when a predetermined condition is satisfied;
    a storage unit configured to store, as a reference magnetic pole position of the synchronous motor, a magnetic pole position that is detected where there is no error in a mounting position of the position detector; and
    a determination unit configured to compare the reference magnetic pole position stored in the storage unit with the magnetic pole position detected by the magnetic pole position detector and determine that detection of the magnetic pole position is abnormal when a difference between the reference magnetic pole position and the detected magnetic pole position falls out of a predetermined range.

2. The magnetic pole position detecting device for a synchronous motor according to claim 1, wherein the magnetic pole position detector is configured to determine that the predetermined condition is satisfied when a controller for controlling the drive of the synchronous motor is energized.

3. The magnetic pole position detecting device for a synchronous motor according to claim 1, wherein the magnetic pole position detector is configured to determine that the predetermined condition is satisfied when an operator's instruction to start abnormality determination is given.

4. The magnetic pole position detecting device for a synchronous motor according to claim 1, further comprising a drive prohibiting unit configured to prohibit the synchronous motor from driving when the determination unit determines that there is an abnormality.

5. The magnetic pole position detecting device for a synchronous motor according to claim 1, further comprising a notifier configured to notify the operator of the occurrence of an abnormality when the determination unit determines that there is an abnormality.

6. The magnetic pole position detecting device for a synchronous motor according to claim 1, wherein, at least part of the magnetic pole position detecting device is provided in a controller for controlling the driving of the synchronous motor or in a host controller for controlling the controller.

7. The magnetic pole position detecting device for a synchronous motor according to claim 1, wherein:
    when the predetermined condition is satisfied, a current of a predetermined excitation phase is supplied to the synchronous motor from a controller for controlling the drive of the synchronous motor; and
    the magnetic pole position detector is configured to detect the magnetic pole position, based on the rotational position of the rotor of the synchronous motor when the current of the predetermined excitation phase is supplied.

8. A magnetic pole position detecting method for a synchronous motor, the synchronous motor is provided with a position detector configured to detect a rotational position of the synchronous motor,
    the method comprising:
    a magnetic pole position detecting step of detecting a magnetic pole position of the synchronous motor based on the rotational position detected by the position detector when a predetermined condition is satisfied;
    a storing step of storing in a storage unit, as a reference magnetic pole position of the synchronous motor, a magnetic pole position that is detected where there is no error in a mounting position of the position detector; and
    a determination step of comparing the reference magnetic pole position stored in the storage unit with the detected magnetic pole position and determining that detection of the magnetic pole position is abnormal when a difference between the reference magnetic pole position and the detected magnetic pole position falls out of a predetermined range.

9. The magnetic pole position detecting method for a synchronous motor according to claim 8, wherein the magnetic pole position detecting step regards that the predetermined condition is satisfied when a controller for controlling the drive of the synchronous motor is energized.

10. The magnetic pole position detecting method for a synchronous motor according to claim 8, wherein the magnetic pole position detecting step regards that the predetermined condition is satisfied when an operator's instruction to start abnormality determination is given.

11. The magnetic pole position detecting method for a synchronous motor according to claim 8, further comprising a drive prohibiting step of prohibiting the synchronous motor from driving when the determination unit determines that there is an abnormality.

12. The magnetic pole position detecting method for a synchronous motor according to claim 8, further comprising a notifying step of notifying the operator of the occurrence of an abnormality when the determination unit determines that there is an abnormality.

13. The magnetic pole position detecting method for a synchronous motor according to claim 8, wherein:
- when the predetermined condition is satisfied, a current of a predetermined excitation phase is supplied to the synchronous motor from a controller for controlling the drive of the synchronous motor; and
- the magnetic pole position detecting step detects the magnetic pole position, based on the rotational position of the rotor of the synchronous motor when the current of the predetermined excitation phase is supplied.

\* \* \* \* \*